US010707469B2

United States Patent
Winter

(10) Patent No.: US 10,707,469 B2
(45) Date of Patent: Jul. 7, 2020

(54) FLOWING ELECTROLYTE BATTERY SEPARATOR

(71) Applicant: RedFlow R&D Pty Ltd, Queensland (AU)

(72) Inventor: Alexander Rudolf Winter, Queensland (AU)

(73) Assignee: RedFlow R&D Pty Ltd, Queensland (AU)

( * ) Notice: Subject to any disclaimer, the term of this patent is extended or adjusted under 35 U.S.C. 154(b) by 272 days.

(21) Appl. No.: 15/117,003

(22) PCT Filed: Feb. 13, 2015

(86) PCT No.: PCT/AU2015/050053
§ 371 (c)(1),
(2) Date: Aug. 5, 2016

(87) PCT Pub. No.: WO2015/120520
PCT Pub. Date: Aug. 20, 2015

(65) Prior Publication Data
US 2017/0170444 A1    Jun. 15, 2017

(30) Foreign Application Priority Data
Feb. 14, 2014 (AU) .................... 2014900451

(51) Int. Cl.
| H01M 2/18 | (2006.01) |
| H01M 12/08 | (2006.01) |
| H01M 8/026 | (2016.01) |
| H01M 2/14 | (2006.01) |
| H01M 8/18 | (2006.01) |
| H01M 8/0247 | (2016.01) |
| H01M 10/36 | (2010.01) |

(52) U.S. Cl.
CPC .............. *H01M 2/18* (2013.01); *H01M 2/14* (2013.01); *H01M 2/145* (2013.01); *H01M 8/026* (2013.01); *H01M 8/0247* (2013.01); *H01M 8/184* (2013.01); *H01M 12/085* (2013.01); *H01M 10/365* (2013.01); *Y02E 60/128* (2013.01)

(58) Field of Classification Search
CPC .......... H01M 2/14; H01M 2/145; H01M 2/18; H01M 8/026
USPC ......................................... 429/129
See application file for complete search history.

(56) References Cited

U.S. PATENT DOCUMENTS

| 4,396,689 | A | * | 8/1983 | Grimes ................... C25B 13/02 |
| | | | | 204/295 |
| 4,652,504 | A | * | 3/1987 | Ando ...................... H01M 2/18 |
| | | | | 429/105 |
| 2006/0141350 | A1 | | 6/2006 | Dreyer et al. |
| 2010/0119937 | A1 | | 5/2010 | Winter |
| 2012/0312735 | A1 | * | 12/2012 | Wood ..................... B29C 45/14 |
| | | | | 210/493.1 |
| 2013/0029206 | A1 | * | 1/2013 | Lev ........................ H01M 2/206 |
| | | | | 429/161 |
| 2013/0068371 | A1 | * | 3/2013 | Lee ........................ B32B 37/00 |
| | | | | 156/73.1 |

FOREIGN PATENT DOCUMENTS

| DE | 8123831 U | 1/1982 |
| EP | 0066938 A2 | 12/1982 |
| EP | 0225315 A1 | 6/1987 |
| EP | 0935299 A1 | 8/1999 |
| WO | 2002025754 A1 | 3/2002 |
| WO | 2011088522 A1 | 7/2011 |

OTHER PUBLICATIONS

PCT International Search Report and Written Opinion dated Apr. 9, 2015 for Intl. App. No. PCT/AU2015/050053, from which the instant application is based, 8 pgs.
PCT International Preliminary Report on Patentability dated Jan. 19, 2016 for Intl. App. No. PCT/AU2015/050053, from which the instant application is based, 12 pgs.
European Patent Application No. 15748669, Extended European Search Report dated Jun. 8, 2017, 7 pages.

* cited by examiner

*Primary Examiner* — Ladan Mohaddes
(74) *Attorney, Agent, or Firm* — Fredrikson & Byron, P.A.

(57) ABSTRACT

A separator for a flowing electrolyte battery, and a method of forming such a separator, enable improved efficiency in a flowing electrolyte battery. The separator includes a sheet having a first surface and a second surface opposing the first surface. A first spacer element is disposed on the first surface, and a second spacer element is disposed on the second surface. The first spacer element is wider than the second spacer element in a direction that is both parallel to the first and second surfaces and perpendicular to longitudinal axes of the first and second spacer elements.

5 Claims, 5 Drawing Sheets

FLOWING ELECTROLYTE BATTERY SEPARATOR

RELATED APPLICATIONS

This application is a 35 U.S.C. 371 national stage filing from International Application No. PCT/AU2015/050053, filed Feb. 13, 2015, which claims priority to Australian Application No. 2014900451, filed Feb. 14, 2014, the teachings of which are incorporated herein by reference.

FIELD OF THE INVENTION

The present invention relates to flowing electrolyte batteries. In particular, although not exclusively, the invention relates to a separator for a flowing electrolyte battery.

BACKGROUND TO THE INVENTION

Flowing electrolyte batteries, such as zinc-bromine batteries, zinc-chlorine batteries, and vanadium flow batteries, offer an important improvement over lead-acid batteries. Typical lead-acid batteries often have very short lifetimes in hot climate conditions, especially when they are occasionally fully discharged. Lead-acid batteries are also environmentally hazardous, since lead is a major component of lead-acid batteries and can cause serious environmental problems during manufacturing and disposal. The useful lifetime of flowing electrolyte batteries is, on the other hand, not affected by deep discharge applications, and the energy to weight ratio of flowing electrolyte batteries is up to six times higher than that of lead-acid batteries.

FIG. 1 illustrates a basic zinc-bromine flowing electrolyte battery 100, according to the prior art. The zinc-bromine battery 100 includes a negative electrolyte circulation path 105 and an independent positive electrolyte circulation path 110. The negative electrolyte circulation path 105 contains zinc ions as an active chemical, and the positive electrolyte circulation path 110 contains bromine ions as an active chemical. The zinc-bromine battery 100 also comprises a negative electrolyte pump 115, a positive electrolyte pump 120, a negative zinc electrolyte (anolyte) tank 125, and a positive bromine electrolyte (catholyte) tank 130.

To obtain high voltage, the zinc-bromine battery 100 further comprises a stack of cells 135 connected in a bipolar arrangement, the stack of cells 135 producing a total voltage higher than that of the individual cells.

For example, a cell 135 comprises half cells 140, 145 including a bipolar electrode plate 155 and a micro porous separator plate 165. The micro porous separator plate 165 often includes a plurality of spacing ribs, which separate surfaces of the bipolar electrode plate 155 and the micro porous separator plate 165. Without such spacing ribs, the micro porous separator plate 165 could move too close to the electrode plate 155 and restrict flow of electrolyte.

The zinc-bromine battery 100 then has a positive polarity end at a collector electrode plate 160, and a negative polarity end at another collector electrode plate 150.

A chemical reaction in a positive half cell, such as the half cell 145, during charging can be described according to the following equation:

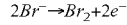  Eq. 1

Bromine is thus formed in half cells in hydraulic communication with the positive electrolyte circulation path 110 and is then stored in the positive bromine electrolyte tank 130. A chemical reaction in a negative half cell, such as the half cell 140, during charging can be described according to the following equation:

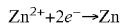  Eq. 2

A metallic zinc layer 170 is thus formed on the collector electrode plate 150 in contact with the negative electrolyte circulation path 105. Chemical reactions in the half cells 140, 145 during discharging are then the reverse of Eq. 1 and Eq. 2.

However, a problem with the zinc-bromine flowing electrolyte battery 100 of the prior art is that the spacing ribs reduce an effective surface area of the electrode plate 155, and in some cases may obstruct more than ten percent of the flow surface of the electrode plate 155. This in turn reduces an efficiency of the zinc-bromine flowing electrolyte battery 100.

A further problem with the basic zinc-bromine flowing electrolyte battery 100 of the prior art is that dendrites can form on a surface of the electrode plate 155, which in turn can puncture the micro porous separator plate 165. A puncture of a micro porous separator plate 165 can enable the mixing of positive and negative electrolyte, thus chemically discharging the battery, or more critically causing an electrical short circuit. Furthermore, it is impractical to replace a micro porous separator plate 165 that has been punctured.

Yet a further problem with the basic zinc-bromine flowing electrolyte battery 100 of the prior art is that zinc plate de-lamination can occur. In such case, plated zinc separates from a surface of the electrode plate 155, which can in turn damage the zinc-bromine flowing electrolyte battery 100. This is particularly problematic when large temperature changes occur at a high state of charge.

There is therefore a need to overcome or alleviate many of the above discussed problems associated with flowing electrolyte batteries of the prior art.

OBJECT OF THE INVENTION

It is an object of some embodiments of the present invention to provide consumers with improvements and advantages over the above described prior art, and/or overcome and alleviate one or more of the above described disadvantages of the prior art, and/or provide a useful commercial choice.

SUMMARY OF THE INVENTION

According to one aspect, the present invention resides in a separator for a flowing electrolyte battery, the separator comprising: a sheet having a first surface and a second surface opposing the first surface;
a first spacer element on the first surface; and
a second spacer element on the second surface;
wherein the first spacer element is wider than the second spacer element in a direction that is both parallel to the first and second surfaces and perpendicular to longitudinal axes of the first and second spacer elements.

Preferably, the first spacer element is opposing the second spacer element.

Preferably, the first spacer element is aligned with the second spacer element in a direction normal to the sheet.

Preferably, the second spacer element lies at least partially in a footprint of the first spacer element.

Preferably, the second spacer element lies entirely in a footprint of the first spacer element.

Preferably, the second spacer element lies centrally in a footprint of the first spacer element in at least one direction.

Preferably, the first spacer element comprises a first spacer rib and the second spacer element comprises a second spacer rib.

Preferably, the separator comprises:

a first plurality of spacer ribs on the first surface; and a second plurality of spacer ribs on the second surface;

wherein each rib of the first plurality of spacer ribs is thinner than each rib of the second plurality of spacer ribs.

Preferably, the first plurality of spacer ribs and the second plurality of spacer ribs are parallel to each other.

Preferably, the first plurality of spacer ribs and the second plurality of spacer ribs are aligned in a direction normal to the sheet.

Preferably, the first spacer element is elongate and has a rectangular cross section and the second spacer element is elongate and has a non-rectangular cross section.

Preferably, the second spacer element has a curved cross section.

Preferably, the separator comprises a separator for a zinc-bromine flowing electrolyte battery.

Preferably, the first spacer element is a bromine spacer element and the second spacer element is a zinc spacer element.

According to a second aspect, the invention resides in a method of forming a separator of the first aspect, the method comprising:

positioning a first plurality of ribs against a first surface of a sheet;

positioning a second plurality of ribs against a second surface of a sheet; and applying ultrasonic vibration to at least one of the first surface and the second surface of the sheet to bond the first and second plurality of ribs to the sheet.

Preferably, the method further comprises applying a vacuum to at least one of the sheet, the first plurality of ribs and the second plurality of ribs, to prevent one of the sheet, the first plurality of ribs and the second plurality of ribs moving relative to another of the sheet, the first plurality of ribs and the second plurality of ribs.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

Figure 1:
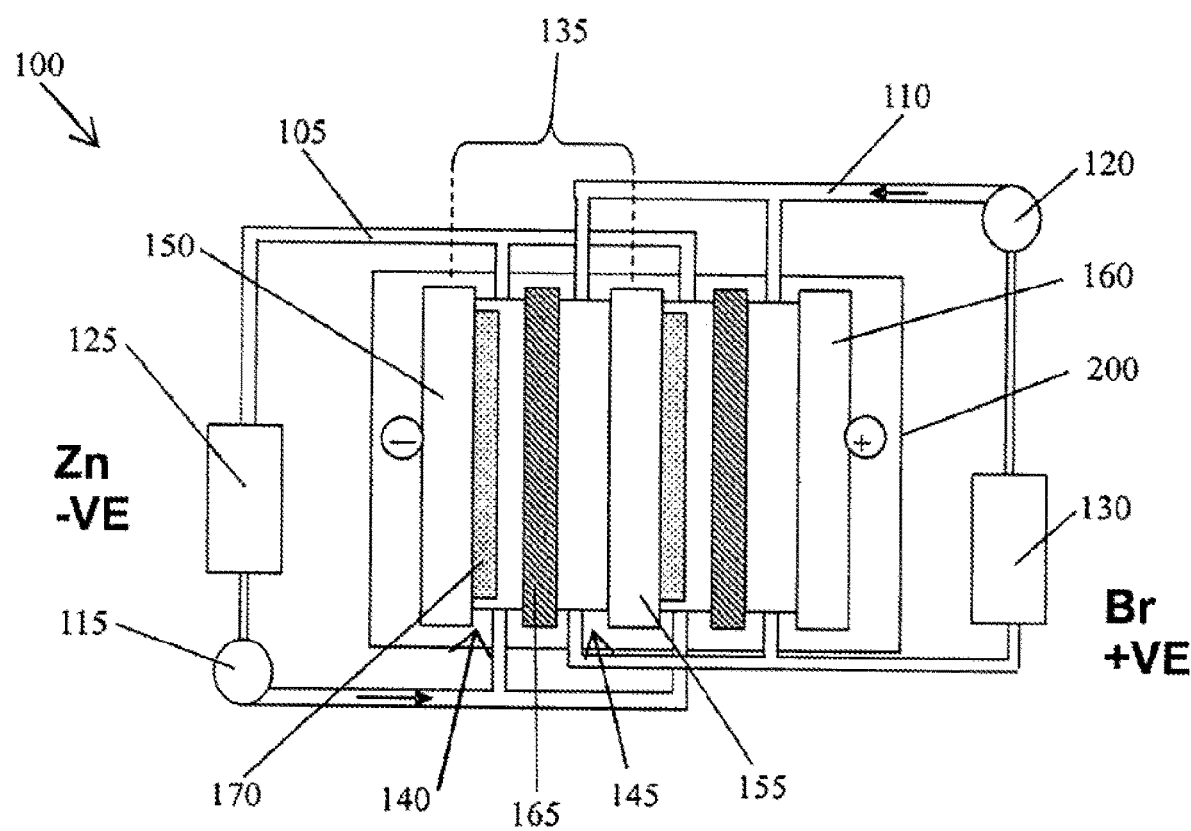
FIG. 1 illustrates a basic zinc-bromine flowing electrolyte battery, according to the prior art.

Those skilled in the art will appreciate that minor deviations from the layout of components as illustrated in the drawings will not detract from the proper functioning of the disclosed embodiments of the present invention.

DETAILED DESCRIPTION OF THE INVENTION

Embodiments of the present invention comprise separators for flowing electrolyte batteries and methods of making separators. Elements of the invention are illustrated in concise outline form in the drawings, showing only those specific details that are necessary to the understanding of the embodiments of the present invention, but so as not to clutter the disclosure with excessive detail that will be obvious to those of ordinary skill in the art in light of the present description.

In this patent specification, adjectives such as first and second, left and right, front and back, top and bottom, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

The reference to any prior art in this specification is not, and should not be taken as, an acknowledgement or any form of suggestion that the prior art forms part of the common general knowledge.

According to one aspect, the present invention resides in a separator for a flowing electrolyte battery, the separator comprising: a sheet having a first surface and a second surface opposing the first surface; a first spacer element on the first surface; and a second spacer element on the second surface; wherein the first spacer element is wider than the second spacer element in a direction parallel to the first and second surfaces.

Advantages of certain embodiments of the present invention include an ability to prevent dendrite growth in a flowing electrolyte battery, which can in turn increase a reliability and reduce operating costs of the flowing electrolyte battery.

A further advantage of certain embodiments of the present invention includes an ability to prevent zinc plate delamination from occurring by providing a mechanical locking of zinc to a surface of the electrode.

Yet a further advantage of certain embodiments of the present invention includes an ability to provide an increased effective surface area of the electrode plate, without sacrificing stability of the electrode plate.

Figure 2:
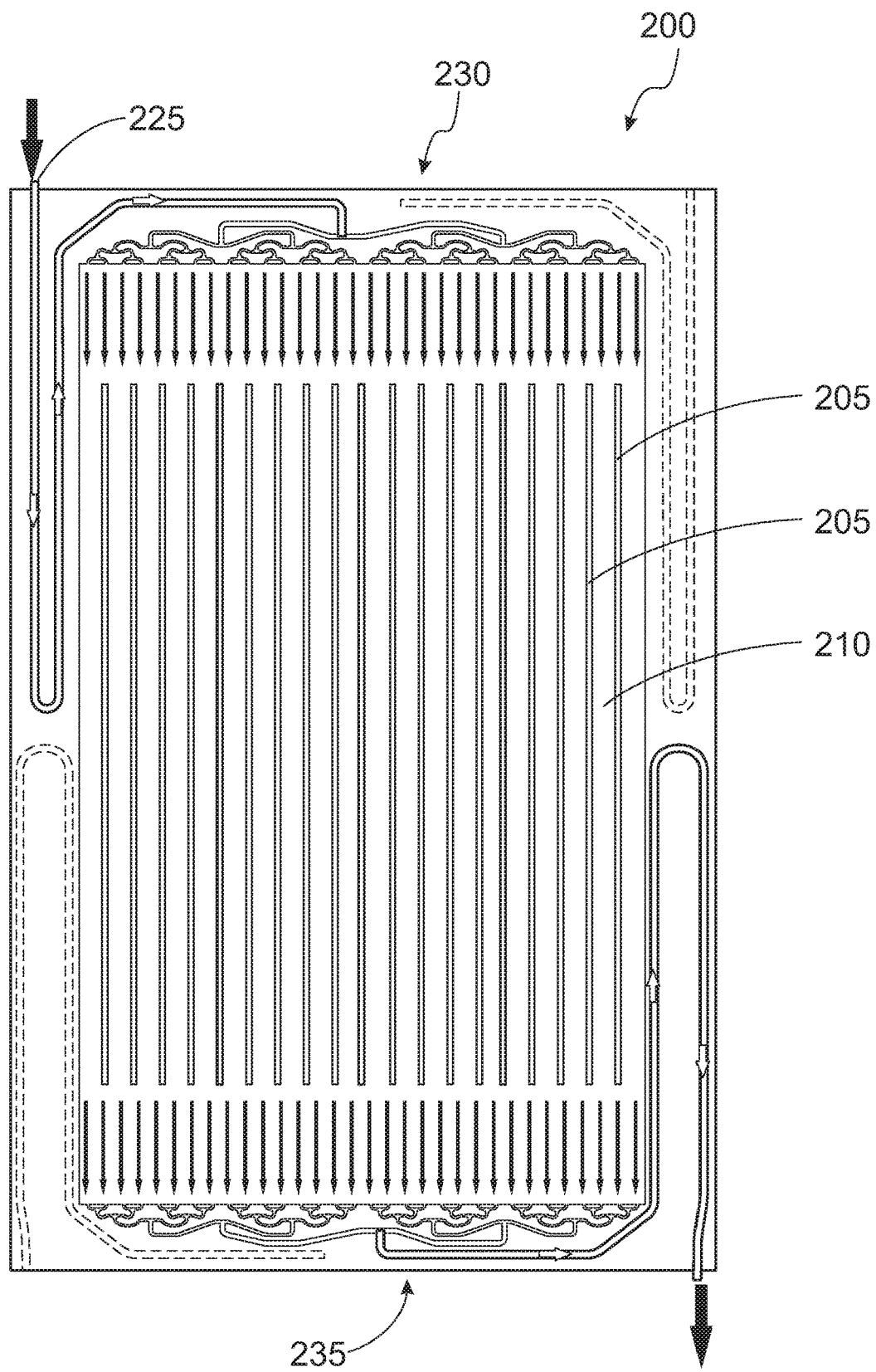
FIG. 2 illustrates a top perspective view of a separator for a flowing electrolyte battery shown overlaying an electrode plate, according to an embodiment of the present invention.
Figure 3:
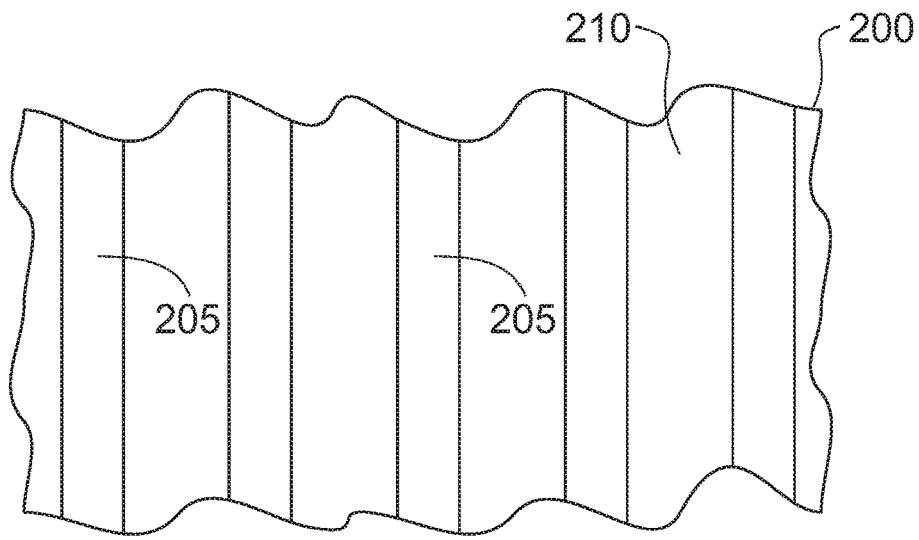
FIG. 3 illustrates a top cut-out view of the separator of FIG. 2.
Figure 4:
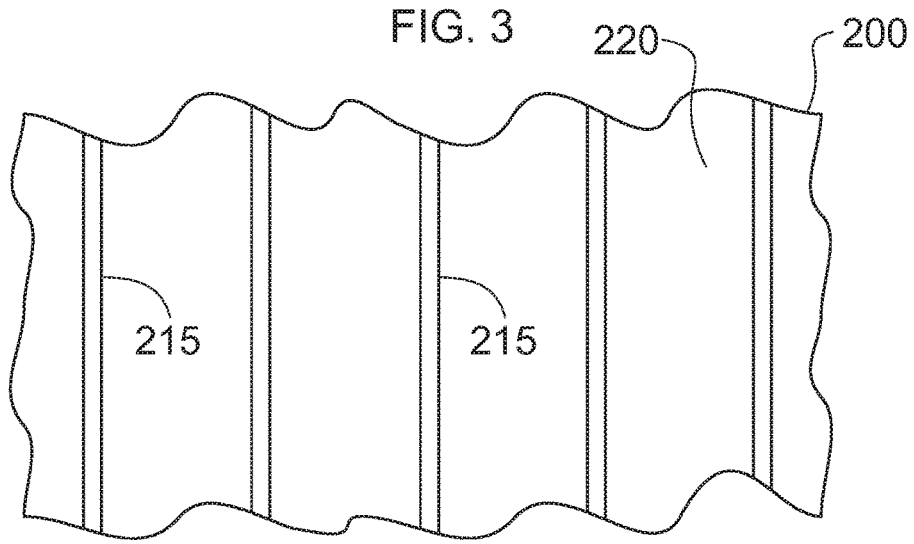
FIG. 4 illustrates a bottom cut-out view of the separator of FIG. 2.

FIG. 2 illustrates a top perspective view of a separator 200 for a flowing electrolyte battery shown overlaying an electrode plate, according to an embodiment of the present invention, FIG. 3 illustrates a top cut-out view of the separator 200 and FIG. 4 illustrates a bottom cut-out view of the separator 200. The separator 200 can, for example, be used with a flowing electrolyte battery similar to the zinc-bromine flowing electrolyte battery 100 of FIG. 1.

The separator 200 includes spacer elements in the form of a plurality of upper spacing ribs 205, for preventing an upper surface 210 of the separator 200 from pressing against a surface of an upper electrode plate of the flowing electrolyte battery, and a plurality of lower spacing ribs 215, for preventing a lower surface 220 of the separator 200 from pressing against a surface of a lower electrode plate of the flowing electrolyte battery.

The separator 200 has a sheet-like form, which enables the separator 200 to be efficiently stacked with battery electrodes. In particular, and as discussed below, the separator 200 can be formed of a sheet and a plurality of upper and lower rib elements.

The separator 200 can be a microporous or ion-selective membrane. As will be understood by those having ordinary skill in the art, the material of the ribs 205, 215 is compatible with the material of the separator 200 so that the ribs 205, 215 can be successfully welded to the separator 200. The rib and separator materials used for zinc bromine batteries can be, for example, polyolefin, polyvinyl chloride (PVC), fluoro carbon or other compatible polymers.

The upper spacing ribs 205 are parallel to each other and the lower spacing ribs 215 are parallel both to each other and to the upper spacing ribs 205. However, the skilled addressee will readily appreciate that non-parallel ribs may also be used. For example, the upper and lower spacing ribs 205, 215 can form a regular or non-regular pattern on the upper and lower surfaces 210, 220.

In use, positive electrolyte enters a half cell of the flowing electrolyte battery at point 225 and then is directed evenly from a first end 230 of the separator 200 across the upper surface 210. The electrolyte is then collected at a second end 235 of the separator. Similarly, negative electrolyte enters a corresponding half cell of the flowing electrolyte battery in a similar manner.

The upper and lower spacing ribs 205, 215 thus separate the flow surfaces 210, 220, respectively, of the separator 200 from corresponding flow surfaces of adjacent electrodes.

Figure 5:
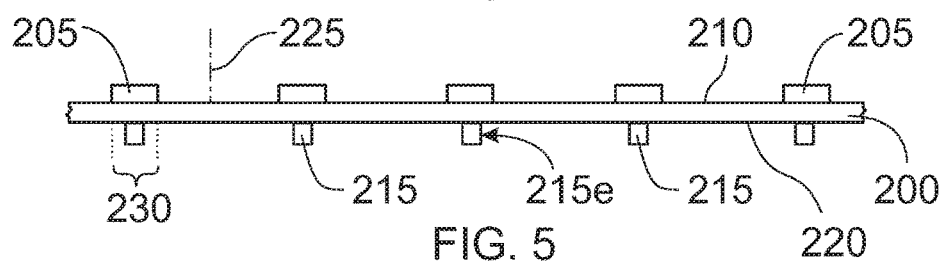
FIG. 5 illustrates a cross sectional view of a portion of the separator of FIG. 2.

FIG. 5 illustrates a cross sectional view of a portion of the separator 200, according to an embodiment of the present invention.

As shown, the upper spacing ribs 205 are opposing the lower spacing ribs 215, and are wider in cross section than the lower spacing ribs 215. Thus the upper spacing ribs 205 are wider than the lower spacing ribs 215 in a direction that is both parallel to the upper and lower surfaces 210, 220 and perpendicular to longitudinal axes of the upper and lower spacing ribs 205, 215.

The location of the upper spacing ribs 205 and the lower spacing ribs 215, and the difference in size between the upper spacing ribs 205 and the lower spacing ribs 215 cause a reduction of current density at edges 215e of the lower spacing ribs 215. The reduction of current density at edges 215e of the lower spacing ribs 215 reduces a likelihood of dendrites forming at the edges.

In the case of a zinc-bromine flowing electrolyte battery, the upper spacing ribs 205 are bromine ribs and the lower spacing ribs 215 are zinc ribs. As such, the separator 200 can prevent growth of zinc dendrites.

The upper spacing ribs 205 are aligned with the lower spacing ribs 215 in a surface normal direction 225 of the upper and lower surfaces 210, 220. In particular, the upper spacing ribs 205 define footprints 230 along the surface normal direction 225. The lower spacing ribs 215 lie centrally in the footprints 230 of the upper spacing ribs 205.

The skilled addressee will, however, readily appreciate that the lower spacing ribs 215 may lie fully or partially in the footprints 230 without deviating from the teachings of the present invention.

As discussed above, the lower spacing ribs 215 are thinner than the upper spacing ribs 205. According to certain embodiments, the lower spacing ribs 215 are also shorter (along the surface normal direction 225) than the upper spacing ribs 205. This can assist in reducing a likelihood that dendrites form at ends of the lower spacing ribs 215.

The upper and lower spacing ribs 205, 215 all have a rectangular cross section. However, as illustrated in FIG. 6, one or more of the upper and lower spacing ribs 205, 215 can form other shapes.

Figure 6:
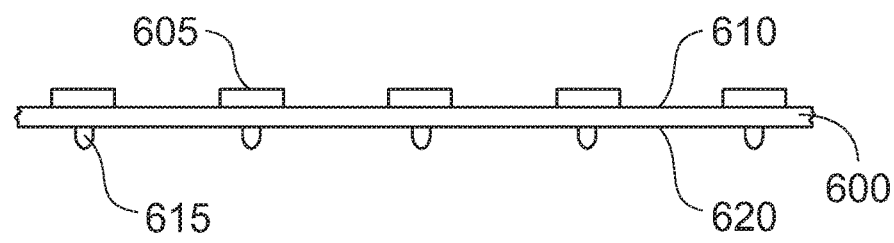
FIG. 6 illustrates a cross sectional view of a portion of a separator, according to an alternative embodiment of the present invention.

FIG. 6 illustrates a cross sectional view of a portion of a separator 600, according to an alternative embodiment of the present invention. The separator 600 can be similar to the separator 200 of FIG. 2.

The separator 600 includes upper spacing ribs 605, an upper surface 610, lower spacing ribs 615 and a lower surface 620, similar to the upper spacing ribs 205, upper surface 210, lower spacing ribs 215 and lower surface 220, respectively, of the separator 200 of FIG. 2.

The upper spacing ribs 605 have a rectangular cross section and the lower spacing ribs 615 have a curved cross section. The curved cross section of the lower spacing ribs 615 enables plating that occurs adjacent the lower surface 620 to mechanically "lock" the separator 600 to the corresponding electrode. In particular, in the case of a zinc-bromine battery, zinc will form under and around the lower spacing ribs 615, and thus provide a mechanical locking of the zinc and the lower spacing ribs 615 to the electrode surface.

The round cross-section of the lower spacing ribs 615 further provides the advantage of increasing a usable surface area of the corresponding electrode that is adjacent to the lower spacing ribs 615, which in turn can increase efficiency of the battery.

The skilled addressee will readily appreciate that the lower spacing ribs 615 can alternatively have various non-rectangular cross sections that would provide a locking of the separator 600 to the electrode and/or enable effective use of a large surface area of the corresponding electrode.

Figure 7:
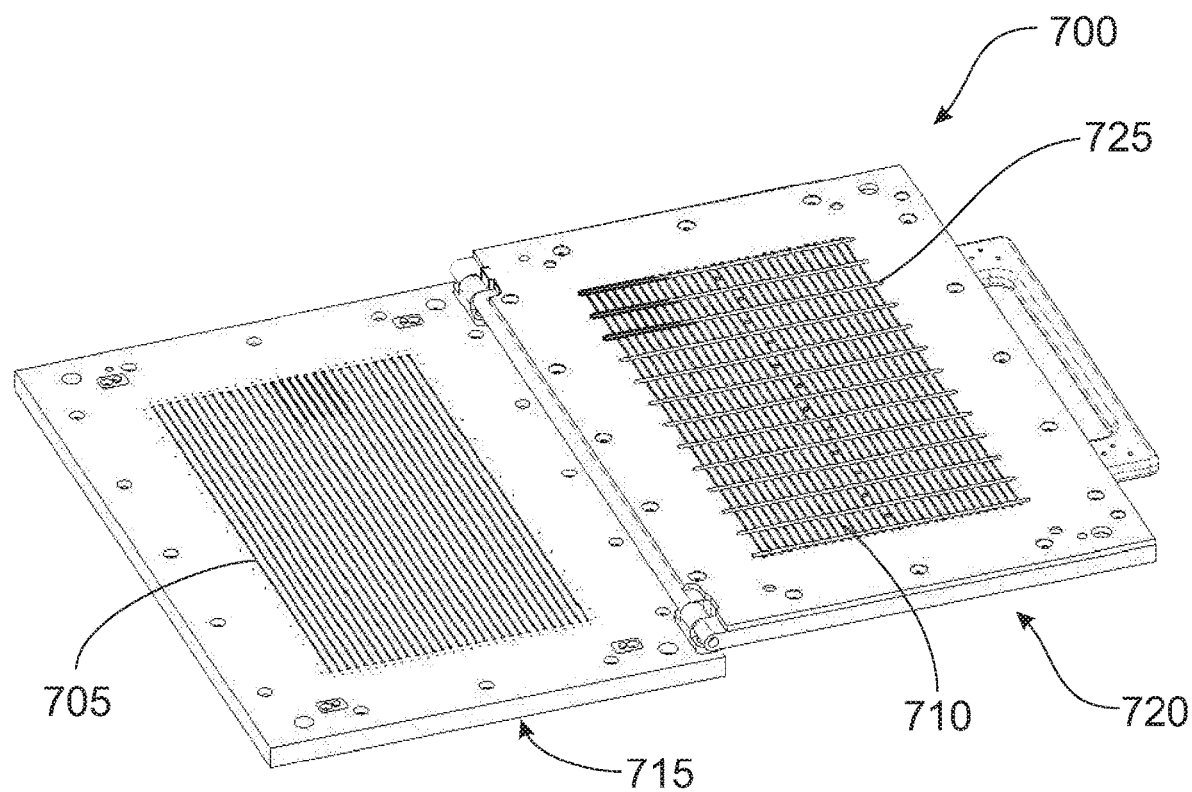
FIG. 7 illustrates a device for manufacturing a separator, in an open configuration, according to an embodiment of the present invention.

FIG. 7 illustrates a clamping device 700 for manufacturing a separator in an open configuration, according to an embodiment of the present invention. The clamping device 700 can, for example, be used to manufacture the separator 200 of FIG. 5 or the separator 600 of FIG. 6.

The clamping device 700 includes a first plurality of channels 705, for receiving a plurality of lower spacing ribs (not shown), and a second plurality of channels 710, for receiving a plurality of upper spacing ribs (not shown). The upper and lower spacing ribs can comprise ribs similar to the upper and lower spacing ribs 205, 215 of FIG. 2.

The first plurality of channels 705 are provided in a first portion 715 of the clamping device 700 and the second plurality of channels 710 are provided in a second portion 720 of the clamping device 700. The second portion 720 of the device clamping 700 also includes a plurality of narrow slots 725 that are orthogonal to the channels 710. The first portion 715 and the second portion 720 are hingedly attached, as illustrated by FIG. 8.

In use, a plurality of lower spacing ribs are placed in the first plurality of channels 705 and a plurality of upper spacing ribs are placed in the second plurality of channels 710. A separator sheet is then placed between the first and second portions 715, 720 of the clamping device 700, and the device 700 is then closed.

Figure 8:
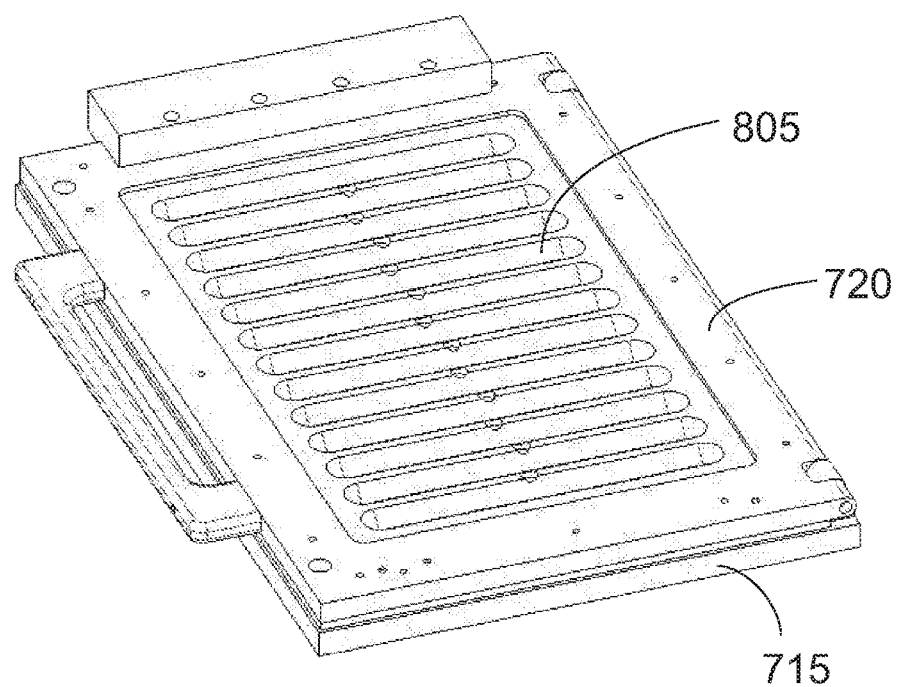
FIG. 8 illustrates the device of FIG. 7 in a closed configuration.

FIG. 8 illustrates the clamping device 700 of FIG. 7 in a closed configuration. The clamping device 700 includes a plurality of wedge shaped channels 805, which extend from an outer surface of the clamping device 700 through the second portion 720 where ends of the channels 805 define the narrow slots 725. The channels 805 are for receiving an ultrasonic welding device, as shown in FIG. 9.

Figure 9:
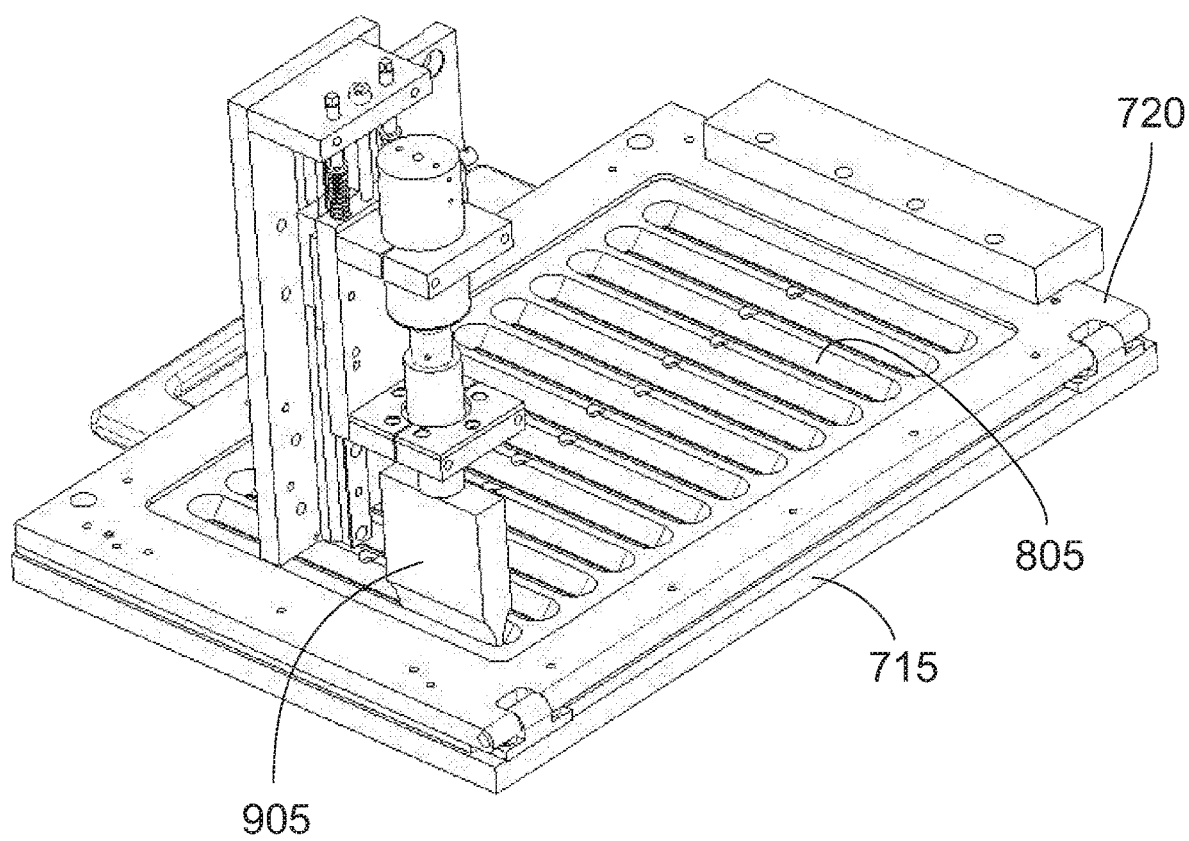
FIG. 9 illustrates the device of FIG. 7 in a closed configuration, together with an ultrasonic welding device.

FIG. 9 illustrates the clamping device 700 of FIG. 7 in a closed configuration, and an ultrasonic welding device 905.

The ultrasonic welding device 905 extends through a channel of the plurality of channels 805 and contacts the upper spacing ribs. The ultrasonic welding device 905 vibrates ultrasonically, which welds the upper and lower spacing ribs to the sheet.

The ultrasonic welding device 905 is configured to weld a portion of the sheet and spacing ribs at a time. As such, the ultrasonic welding device 905 can be configured to automatically move along the plurality of channels 805. Alternatively, the ultrasonic welding device 905 can be moved manually.

According to certain embodiments, the clamping device 700 includes a plurality of vacuum channels, for providing a vacuum to the ribs and/or sheet. This prevents the ribs and sheet from moving during loading of the ribs and separator and when the ultrasonic welding device 905 is used.

The clamping device 700 enables the upper and lower spacing ribs to be precisely placed on the sheet relative to each other, as both the upper and lower spacing ribs are simultaneously welded. Any later shrinkage or distortion of the separator does not affect relative positions of the upper and lower spacing ribs. Furthermore, precise relative location of the upper and lower spacing ribs ensures external compression loads on the separators will not cause misaligned ribs to slip past each other.

In summary, advantages of certain embodiments of the present invention include an ability to prevent dendrite growth in a flowing electrolyte battery, which can in turn increase reliability and reduce operating costs of the flowing electrolyte battery.

A further advantage of certain embodiments of the present invention includes an ability to prevent zinc plate delamination from occurring by providing a mechanical locking of zinc to a surface of the electrode.

Yet a further advantage of certain embodiments of the present invention includes an ability to provide an increased effective surface area of the electrode plate, without sacrificing stability of the surface plate.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A method of forming a separator for a flowing electrolyte battery, the method comprising:
    positioning a first plurality of spacing ribs in a plurality of channels of a first portion of a clamping device;
    positioning a second plurality of spacing ribs in a plurality of channels of a second portion of the clamping device, wherein the ribs of the first plurality of spacing ribs have a different width than the ribs of the second plurality of spacing ribs;
    positioning a separator sheet between the first and second portions of the clamping device;
    clamping the first and second portions of the clamping device together, whereby the first plurality of spacing ribs are on a first side of the separator sheet and lie centrally in footprints of the second plurality of spacing ribs on a second side of the separator sheet;
    extending an ultrasonic welding device through a plurality of slots in the first portion of the clamping device, wherein the slots overlap the channels of the first portion such that the welding device contacts the first plurality of spacing ribs; and
    applying ultrasonic vibration to the welding device to simultaneously bond both the first and second plurality of spacing ribs to the separator sheet.

2. The method of claim 1, wherein the plurality of slots are orthogonal to the channels.

3. The method of claim 1, wherein the first and second portions of the clamping device are hinged together.

4. The method of claim 1, wherein wedge-shaped channels extend from an outer surface of the clamping device, and ends of the wedge-shaped channels define the plurality of slots.

5. The method of claim 1, wherein the clamping device includes a plurality of vacuum channels to prevent the ribs and separator sheet from moving during clamping and during application of the ultrasonic vibration.

\* \* \* \* \*